United States Patent
Choi et al.

(10) Patent No.: US 12,145,233 B2
(45) Date of Patent: Nov. 19, 2024

(54) CONDITIONING DISK REPLACEMENT APPARATUS AND METHOD

(71) Applicant: SAMSUNG ELECTRONICS CO., LTD., Suwon-si (KR)

(72) Inventors: Hoseop Choi, Hwaseong-si (KR); Minseop Park, Suwon-si (KR); Jubong Lee, Hwaseong-si (KR); Sung Yong Park, Suwon-si (KR); Kiju Sohn, Gunpo-si (KR); Jaeyoung Eom, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 70 days.

(21) Appl. No.: 17/745,618

(22) Filed: May 16, 2022

(65) Prior Publication Data

US 2022/0379432 A1     Dec. 1, 2022

(30) Foreign Application Priority Data

May 27, 2021  (KR) .......................... 10-2021-0068620

(51) Int. Cl.
| | | |
|---|---|---|
| *B23Q 3/155* | (2006.01) | |
| *B24B 53/017* | (2012.01) | |
| *B24D 9/08* | (2006.01) | |

(52) U.S. Cl.
CPC ......... *B23Q 3/15513* (2013.01); *B24D 9/085* (2013.01); *B24B 53/017* (2013.01); *Y10T 483/174* (2015.01)

(58) Field of Classification Search
CPC .............. Y10T 483/174; B24D 9/085; B23Q 3/15536; B23Q 2003/15537; B65D 85/58

USPC ...... 483/33; 451/494; 211/70.6, 41.1, 41.18, 211/DIG. 1; 257/124; 81/3.27, 3.55–3.57
See application file for complete search history.

(56) References Cited

U.S. PATENT DOCUMENTS

| | | | | |
|---|---|---|---|---|
| 5,231,803 | A * | 8/1993 | Lanzer | .................. B24D 9/085 |
| | | | | 451/28 |
| 5,482,496 | A * | 1/1996 | Lanzer | .................. B24B 23/03 |
| | | | | 901/41 |
| 6,030,326 | A * | 2/2000 | Azuma | ............. B23Q 3/15722 |
| | | | | 483/30 |
| 6,244,941 | B1 | 6/2001 | Bowman et al. | |
| 6,379,221 | B1 | 4/2002 | Kennedy et al. | |
| 7,217,172 | B2 | 5/2007 | Benner | |
| 7,343,656 | B2 * | 3/2008 | Belanger | ................. B23Q 7/04 |
| | | | | 409/211 |

(Continued)

FOREIGN PATENT DOCUMENTS

| | | | |
|---|---|---|---|
| JP | 4259048 B2 | 4/2009 | |
| JP | 6731827 B2 | 7/2020 | |

(Continued)

*Primary Examiner* — Sunil K Singh
*Assistant Examiner* — Michael Vitale
(74) *Attorney, Agent, or Firm* — Fish & Richardson P.C.

(57) ABSTRACT

A conditioning disk replacement apparatus includes; a detacher configured to separate a conditioning disk from to a holder, a transfer part configured to transfer the conditioning disk, and a container configured to store the conditioning disk. The detacher includes a detachment body and a rotary part coupled to the detachment body, the rotary part includes a key protruding outward from the rotary part in a first horizontal direction, and the rotary part is configured to rotate about a central axis extending in the first horizontal direction.

13 Claims, 12 Drawing Sheets

(56) References Cited

U.S. PATENT DOCUMENTS

| | | | |
|---|---|---|---|
| 2010/0099342 A1 | 4/2010 | Chen et al. | |
| 2012/0142255 A1* | 6/2012 | Panergo | B24B 27/0038 |
| | | | 451/28 |
| 2014/0179204 A1 | 6/2014 | Shinozaki | |
| 2016/0114444 A1* | 4/2016 | Hofmann | B23Q 3/15536 |
| | | | 483/1 |
| 2019/0001460 A1* | 1/2019 | Staubli | B23Q 3/15526 |
| 2019/0358757 A1* | 11/2019 | Terada | B28D 5/0082 |
| 2020/0324393 A1 | 10/2020 | Unnerstall et al. | |

FOREIGN PATENT DOCUMENTS

| | | |
|---|---|---|
| KR | 10-0681683 B1 | 2/2007 |
| KR | 20110017677 | 2/2011 |

\* cited by examiner

CONDITIONING DISK REPLACEMENT APPARATUS AND METHOD

CROSS-REFERENCE TO RELATED APPLICATION

This U.S. nonprovisional application claims priority under 35 U.S.C § 119 to Korean Patent Application No. 10-2021-0068620 filed on May 27, 2021 in the Korean Intellectual Property Office, the subject matter of which is hereby incorporated by reference in its entirety.

BACKGROUND

The inventive concept relates generally to conditioning disk replacement apparatuses and methods. More particularly, the inventive concept relates to conditioning disk replacement apparatuses capable of automatically replacing conditioning disks and method using same.

Various processes (e.g., photolithography, etching, deposition, and cleaning processes) are performed to fabricate a semiconductor device. Semiconductor devices are fabricated on a material substrate commonly referred to as a wafer. At one or more steps during the fabrication of the semiconductor device, a surface of the wafer must be planarized before subsequent process(es) may be performed.

Wafer planarization may be accomplished using one or more polishing processes. So-called, chemical mechanical polishing (CMP) is one type of wafer polishing that may be used to planarize a wafer surface. During CMP processes, a conditioning disk may be used to planarize the surface of the wafer. That is, as the abrasive conditioning disk is brought into contact with a rotating wafer, the surface of the wafer may be selectively ground away by action of the applied conditioning disk.

However, such grinding action tends to damage the conditioning disk over time. Accordingly, it is necessary to periodically replace the conditioning disk.

SUMMARY

Embodiments of the inventive concept provide conditioning disk replacement apparatuses capable of promptly and accurately replacing conditioning disks, as well as conditioning disk replacement methods using same.

Embodiments of the inventive concept provide conditioning disk replacement apparatuses capable of automatically replacing conditioning disks as well as conditioning disk replacement methods using same.

Embodiments of the inventive concept provide conditioning disk replacement apparatuses having a relatively simple structure that improves the accuracy and reliability of conditioning disk replacements methods.

Other advantages, objects, and features, as well as the making and use of the inventive concept, may be understood upon consideration of the following detailed description together with the accompanying drawings.

According to embodiments of the inventive concept, a conditioning disk replacement apparatus may include; a detacher configured to separate a conditioning disk from to a holder, a transfer part configured to transfer the conditioning disk, and a container configured to store the conditioning disk. The detacher may include; a detachment body and a rotary part coupled to the detachment body, the rotary part includes a key protruding outward from the rotary part in the first horizontal direction, and the rotary part is configured to rotate about an axis extending in the first horizontal direction.

According to embodiments of the inventive concept, a conditioning disk replacement method may include; inserting a key of a detacher into a groove between a holder and an old conditioning disk coupled to a lower surface of the holder, and rotating the key to press an upper surface of the key on a portion of the lower surface of the holder and press a lower surface of the key on a portion of an upper surface of the old conditioning disk to separate the old conditioning disk from the holder.

According to embodiments of the inventive concept, a conditioning disk replacement apparatus may include; a detacher configured to separate a conditioning disk from a holder of a chemical mechanical polishing apparatus, wherein the detacher includes a detachment body and a rotary part coupled to the detachment body, the rotary part includes a key protruding in a first horizontal direction from the detachment body and extending in a second horizontal direction, and the rotary body is configured to rotate about an axis extending in the first horizontal direction.

DETAILED DESCRIPTION

Throughout the written description and drawings, like reference numbers and labels are used to denote like or similar elements and/or features. Throughout the written description certain geometric terms may be used to highlight relative relationships between elements, components and/or features with respect to certain embodiments of the inventive concept. Those skilled in the art will recognize that such geometric terms are relative in nature, arbitrary in descriptive relationship(s) and/or directed to aspect(s) of the illustrated embodiments. Geometric terms may include, for example: height/width; vertical/horizontal; top/bottom; higher/lower; closer/farther; thicker/thinner; proximate/distant; above/below; under/over; upper/lower; center/side; surrounding; overlay/underlay; etc.

Figure 1:
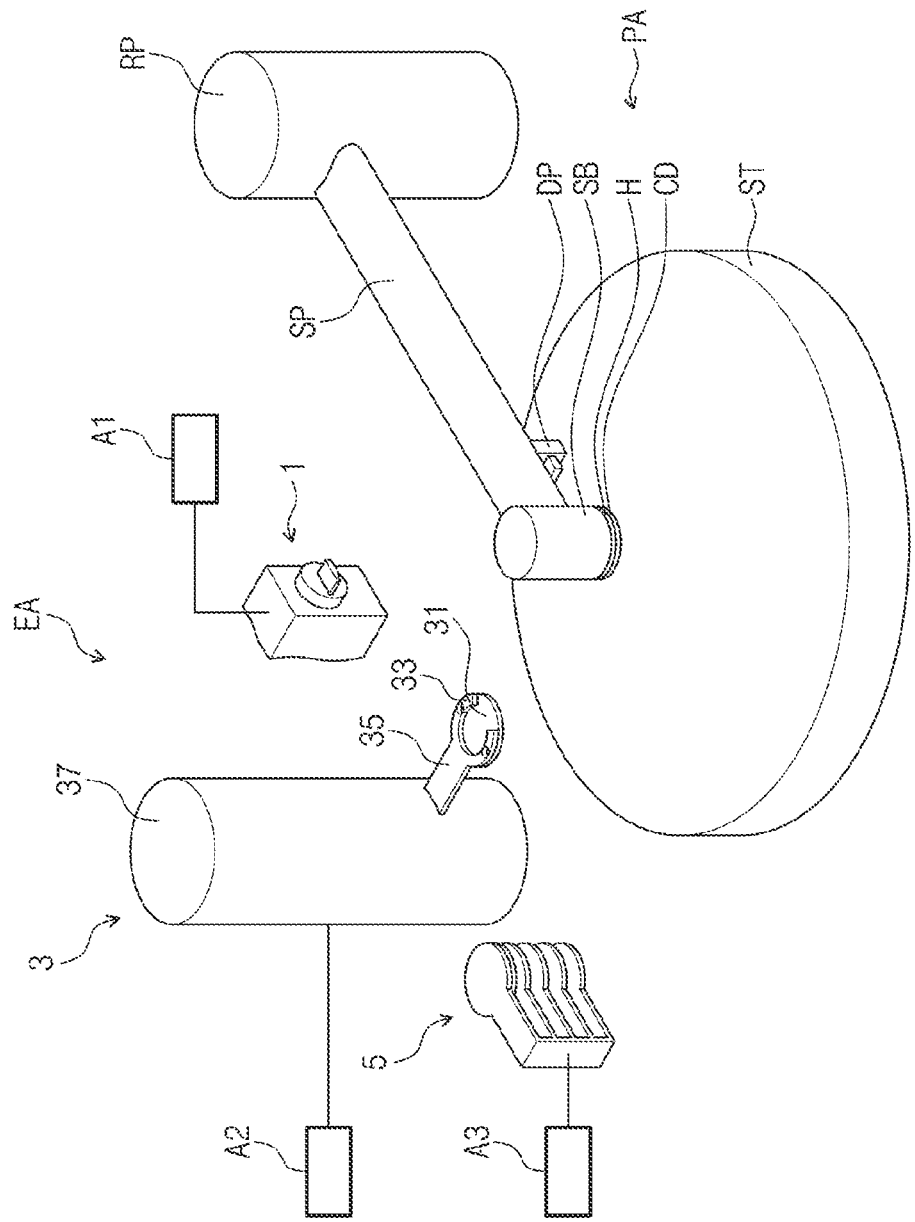
FIG. 1 is a perspective view illustrating a chemical mechanical polishing (CMP) apparatus and a conditioning disk replacement apparatus according to embodiments of the inventive concept.

Figure (FIG. 1 is a perspective view illustrating a chemical mechanical polishing (CMP) apparatus (PA) and a conditioning disk replacement apparatus (EA) according to embodiments of the inventive concept.

The CMP apparatus PA may be a device configurable to variously polish a wafer surface. For example, the CMP apparatus PA may be a device capable of performing a CMP process to a semiconductor wafer. The CMP apparatus PA may include a stage ST, a holder H, a holder support member SB, a connection part SP, a holder rotary part RP, and a holder observation part DP. The stage ST may provide a stable plane on which a wafer may be mounted for polishing. In some embodiments, a wafer may rest on an upper surface of the.

The holder H may be vertically separated (e.g., spaced apart) from the stage ST, and may be configured to fix the positioning of a conditioning disk CD. In some embodiments, the holder H may have a cylindrical shape. The holder H and the conditioning disk CD may be variously arranged. For example, as shown in FIG. 1, a lower surface of the holder H and an upper surface of the conditioning disk CD may be coupled together. Here, the coupling of the holder H with the conditioning disk CD may be accomplished magnetically and/or mechanically.

The holder support member SB may be used to connect the holder H with the connection part SP, such that the connection part SP allows the holder H to variously traverse (or "migrate") over the stage ST.

Thus, in some embodiments, the holder rotary part RP may be rotatable, and may used in conjunction with the connection part SP to stably move the holder H over the surface of the stage ST. For example, rotation of the holder rotary part RP may cause the holder H to move along an arc over the upper surface of the stage ST.

The holder observation part DP may be used to variously observe the state of the holder H. For example, the holder observation part DP may capture a state of the holder H and generate corresponding state information indicating whether or not the conditioning disk CD is properly coupled to the holder H. Alternately or additionally, the holder observation part DP may capture a state of an exposed (e.g., bottom) surface of the conditioning disk CD and generate corresponding state information. For example, the holder observation part DP may visually image the exposed surface of the conditioning disk CD to collect state information indicating a current abrasive state of the conditioning disk CD.

In this regard, the holder observation part DP may include one or more components capable of capturing various state information regarding the conditioning disk CD and transferring data corresponding to the state information to an external circuit (e.g. a controller). For example, in some embodiments, the holder observation part DP may include an optical sensor, a camera, a data transceiver, a communication device, etc. In some embodiments, the holder observation part DP may variously disposed to allow capture of desired state information. For example, the holder observation part DP may be coupled (e.g., in a connectable/disconnectable manner) to the connection part SP.

The conditioning disk replacement apparatus EA may be a device capable of automatically replacing the conditioning disk CD. In this context, the term "automatically" denotes a routine mechanical ability to replace the conditioning disk without necessary intervention by a human worker. For example, the conditioning disk replacement apparatus EA may be a device configurable to separate a used conditioning disk CD from a holder H and then couple a different (e.g., new or reconditioned) conditioning disk CD to the holder H.

In the illustrated example of FIG. 1, the conditioning disk replacement apparatus EA includes a detacher 1, a transfer part 3, a container 5, a detachment driving part A1, a first driving part A2, and a second driving part A3.

The detacher 1 may be used to separate the conditioning disk CD from the holder H, wherein the detachment driving part A1 may be used operate (or "drive") the detacher 1. More particular examples of the detacher 1 will be described hereafter in some additional detail with reference to FIGS. 2 and 3.

The transfer part 3 may be used to transfer the conditioning disk CD. For example, the transfer part 3 may transfer the used conditioning disk CD from the holder H to the container 5 and/or transfer the new conditioning disk CD from the container 5 to the holder H.

In some embodiments, the transfer part 3 may include a base plate 31, a pressing part 33, a transfer rotary part 37, and a connection member 35. In some embodiments, the base plate 31 may have a disk shape and be configured to support a conditioning disk CD during transfer. That is, the base plate 31 may have a diameter substantially the same as a diameter of the conditioning disk CD.

The pressing part 33 may be disposed on an upper surface and/or a lower surface of the base plate 31. The pressing part 33 may press and fix a conditioning disk CD disposed on the base plate 31. The pressing part 33 may include a mechanism for pressing and fixing the conditioning disk CD. For example, the pressing part 33 may include a pair of gripping claws, wherein the pair of gripping claws may press and fix opposite sides of the conditioning disk CD on the base plate 31.

The transfer rotary part 37 may be used to rotate the base plate 31. That is the connection member 35 may connect the transfer rotary part 37 and the base plate 31, such that the transfer rotary part 37 and the connection member 35 enable the base plate 31 to rotate along a transfer path (e.g., an arc).

The container 5 may be used to store conditioning disks CD. One example of the container 5 will be described hereafter in some additional detail with reference to FIG. 5.

The detachment driving part A1 may be used to move and position the detacher 1. For example, the detachment driving part A1 may laterally (e.g., in at least one of a first horizontal direction D1 and a second horizontal direction D2 intersecting the first horizontal direction) and/or vertically (e.g., in a vertical direction D3 substantially orthogonal to the first and second horizontal directions) drive the detacher 1.

The first driving part A2 may be used to move and position the transfer part 3. For example, the first driving part A2 may laterally and/or vertically drive the transfer part 3.

The second driving part A3 may be used to move and position the container 5. For example the second driving part A3 may laterally ad/or vertically drive the container 5.

In this regard, one or more of the detachment driving part A1, the first driving part A2, and the second driving part A3 may include an actuator (e.g., a linear motor, a rotary motor, and/or a hydraulic motor).

In some embodiments, each of the detachment driving part A1, the first driving part A2, and the second driving part A3 may have a similar configuration. Alternately, one or more of the detachment driving part A1, the first driving part A2, and the second driving part A3 may have a different configuration.

Figure 2:
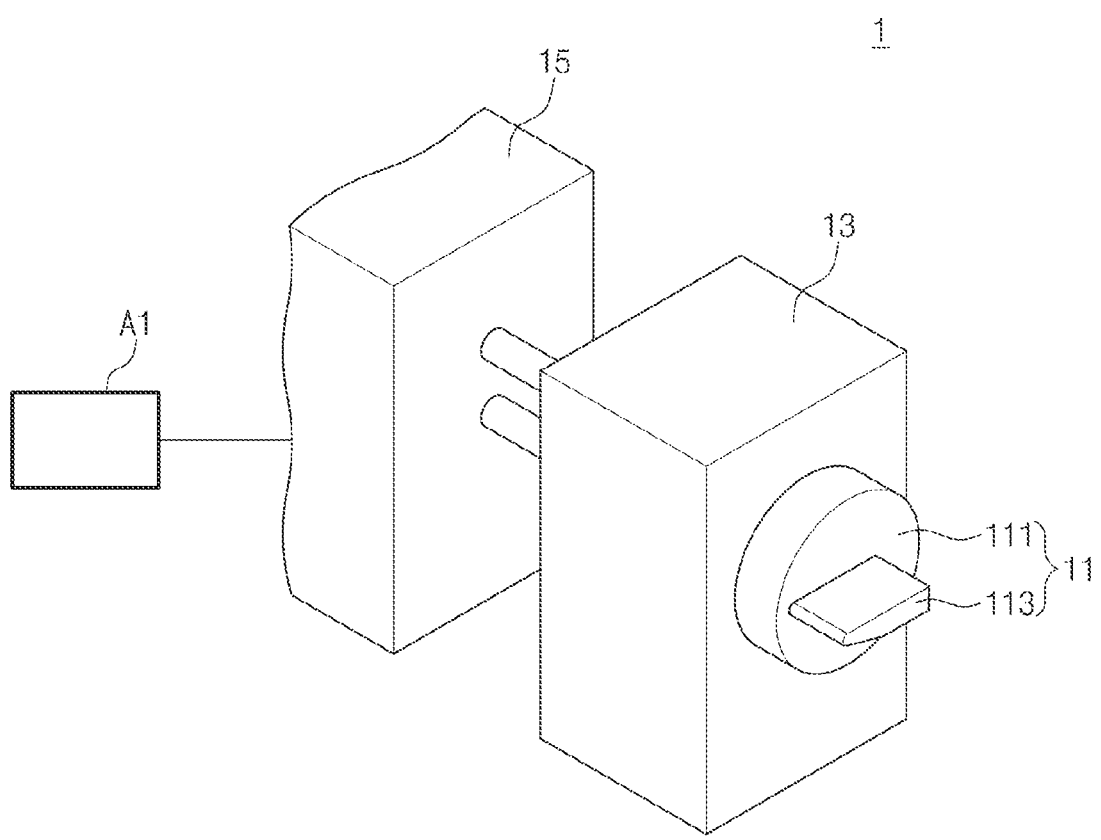
FIGS. 2 and 3 are respective views further illustrating a detacher of a conditioning disk replacement apparatus according to embodiments of the inventive concept.
Figure 3:
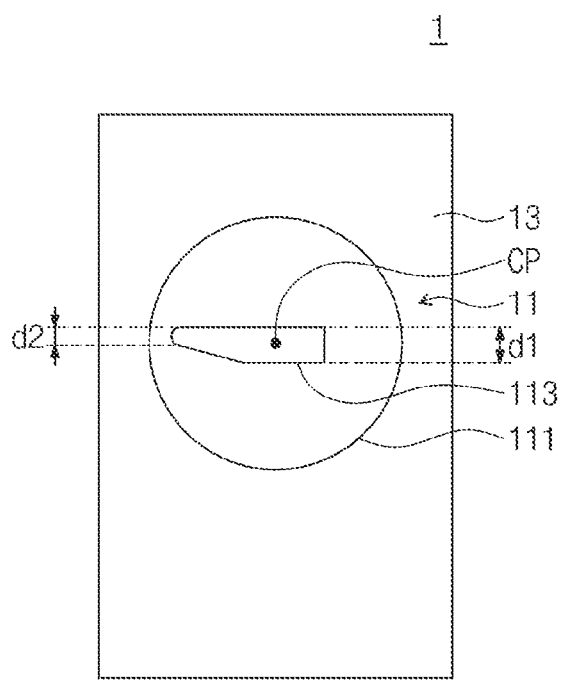
Figure 3:
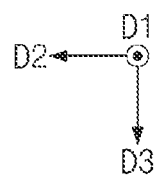

FIG. 2 is a perspective view illustrating the detacher 1 of a conditioning disk replacement apparatus EA according to embodiments of the inventive concept, and FIG. 3 is a front side view further illustrating the detacher 1 of the conditioning disk replacement apparatus EA according to embodiments of the inventive concept.

Referring to FIG. 2, the detacher 1 may include a detachment body 13, a rotary part 11, and a moving part 15, wherein the detachment body 13 may be used to rotate the rotary part 11 and the moving part 15 may be used to move the detachment body 13.

The rotary part 11 may be coupled to a front side of the detachment body 13. The rotary part 11 may rotate about an axis extending in the first horizontal direction D1. The rotary part 11 may include a rotary body 111 and a key 113. In some embodiments, the rotary body 111 may have a disk shape. The rotary body 111 may be coupled to the detachment body 13. The rotary body 111 may protrude outward in the first horizontal direction D1 from the front side of the detachment body 13. The key 113 may be coupled to the rotary body 111, and may protrude outward from the front side of the rotary body 111 in the first horizontal direction D1.

Referring to FIG. 3, the key 113 may also extend in a certain length in the second horizontal direction D2. The key 113 may also include a variable thickness section (e.g., a section having a thickness that varies (e.g., increases or decreases) in the vertical direction D3 along its length in the second horizontal direction D2). For example, a first end (e.g., the right-side end in FIG. 3) of the key 113 may have a first thickness d1, and an opposing, second end (e.g., the left-side end in FIG. 3) of the key 113 may have a second thickness d2 less than the first thickness d1.

In some embodiments, within the variable thickness section of the key 113 may have a thickness that gradually decreases in the second horizontal direction D2. For example, within the variable thickness section of the key 113, the thickness of the key 113 may decrease linearly in the second horizontal direction D2. In some embodiments, a ratio between a thickness of a thickest portion of the key 113 (e.g., measured in the vertical direction D3) and an overall length of the key 113 (e.g., measured in the first horizontal direction D1) may range from about 1:1 to about 1:20. In this regard, however, the ratio between the thickness of the thickest portion of the key 113 and the overall length of the key 113 may be appropriately selected in consideration of diameter and/or thickness of the conditioning disk CD.

Figure 4:
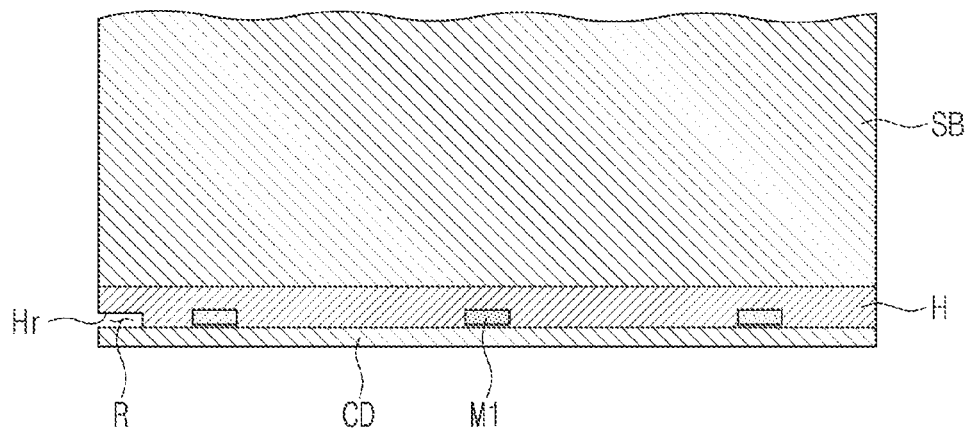
FIG. 4 is a cross-sectional view illustrating a conditioning disk coupled to a holder of a CMP apparatus according to embodiments of the inventive concept.

FIG. 4 is a cross-sectional view illustrating a conditioning disk CD coupled to a holder H of a chemical mechanical polishing (CMP) apparatus according to embodiments of the inventive concept.

Referring to FIG. 4, the holder H is assumed to include an embedded magnet holder M1, but the inventive concept is not limited thereto. At least a portion of the holder magnet M1 may be exposed through the lower surface of the holder H. In some embodiments, the holder magnet M1 may include multiple magnetic portions laterally spaced apart in at least one of the first and second horizontal directions D1 and D2 along the lower surface of the holder H. In this manner, the holder magnet M1 may provide sufficient magnetic force to couple the holder H with a magnetically attractive conditioning disk CD.

In this regard, the conditioning disk CD may include one or more metallic material(s), such that a magnetic coupling between the holder magnet M1 and the conditioning disk CD effectively couples the holder H with the conditioning disk CD.

In some embodiments, the holder H may include a groove R. Here, the groove R may be a recessed surface Hr formed when a portion of the lower surface of the holder H is upwardly recessed. Accordingly, the groove R may partially extend between the conditioning disk CD and the holder H and be disposed at an outer edge of the holder H. For example, the recessed surface Hr may extend inwardly from an outer edge of the lower surface of the holder H.

Figure 5:
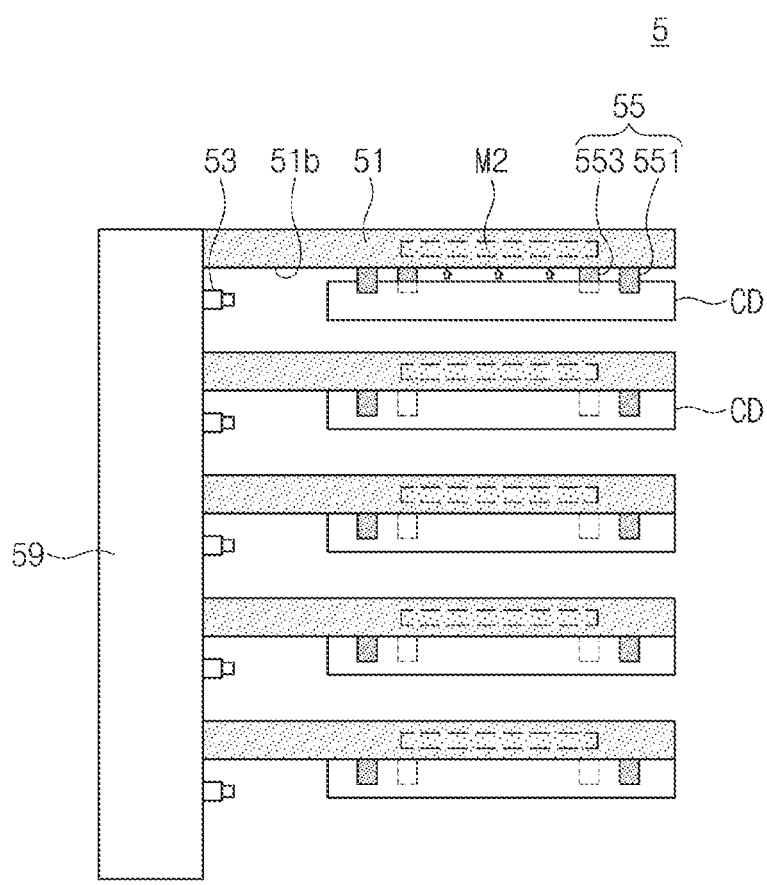
FIG. 5 is a cross-sectional view illustrating a container for a conditioning disk replacement apparatus according to embodiments of the inventive concept.

FIG. 5 is a cross-sectional view further illustrating in one embodiment the container 5 of a conditioning disk replacement apparatus according to embodiments of the inventive concept.

Referring to FIG. 5, the container 5 may include one or more cantilever member(s) 51 extending from and supported by a support pillar 59, wherein each of the one or more cantilever member(s) 51 may include a coupling magnet M2 and one or more guide pin(s) 55, and may be associated with a storage observation part 53 connected to the support pillar 59.

For example, each cantilever member 51 may extend in a horizontal direction from the vertically disposed support pillar 59, such that two or more of the cantilever members 51 are vertically separated (e.g., spaced apart in the vertical direction D3). With this configuration each cantilever member 51 may selectively couple and/or decouple (hereafter, "couple/decouple") a corresponding conditioning disk CD. In this manner, one or more conditioning disks CD may be correspondingly coupled to and supported by a corresponding one of the one or more cantilever members 5. In effect, a number of conditioning disks CD may be vertically stacked to save floor space in a fabrication facility.

As noted above, each of the one or more cantilever members 51 may include a coupling magnet M2 capable of magnetically seizing (or coupled with) a conditioning disk CD. Here, the magnitude of a magnetic force exerted upon the conditioning disk CD by the coupling magnet M2 may be less than a magnetic force exerted by the holder magnet M1 on the conditioning disk CD.

The one or more guide pins 55 may be used to position and couple a conditioning disk CD in relation to a lower surface 51b of the cantilever member 51. In some embodiments, twin guide pins 55 may be provided at each lateral end of the conditioning disk CD. For example, a first guide pin 551 may indicate a first (or forward) edge of the conditioning disk CD, and a second guide pin 553 may indicate a second (or rear) edge of the conditioning disk CD. Between the first guide pin 551 and the second guide pin 553, the conditioning disk CD may be coupled to the lower surface 51b of the cantilever member 51.

Each storage observation part 53 may be used to observe a positioning state of a conditioning click CD with respect to the lower surface 51b of the cantilever member 51. For example, the storage observation part 53 may observe the positioning state of the conditioning disk CD with respect to a coupling state between the lower surface 51b of the cantilever member 51 and the conditioning disk CD. Further in this regard the storage observation part 53 capture relevant information and generate corresponding data. In some embodiments, each storage observation part 53 may include an optical sensor, a data transceiver, a camera, a communication device, etc.

Figure 6:
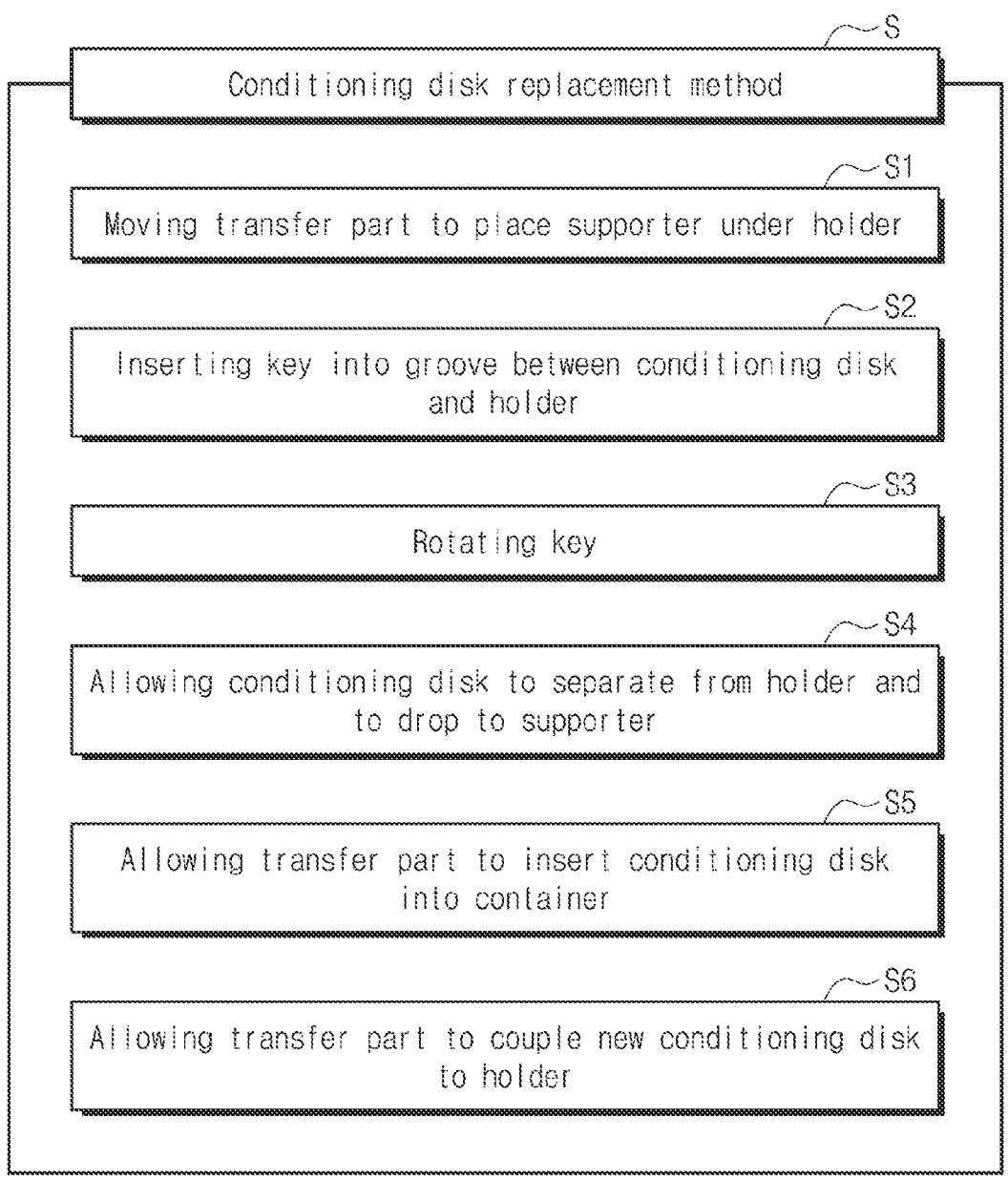
FIG. 6 is a flow chart illustrating a conditioning disk replacement method according to embodiments of the inventive concept.

FIG. 6 is a flow chart illustrating in one embodiment a conditioning disk replacement method 'S' according to embodiments of the inventive concept.

Referring to FIGS. 1 and 6, the conditioning disk replacement method 'S' may be performed by the conditioning disk replacement apparatus EA to replace the conditioning disk CD from the holder H.

In this regard, the conditioning disk replacement method 'S' may include moving the transfer part to place a base plate under a holder (S1), inserting a key into a groove between a conditioning disk and the holder (S2), rotating the key (S3), separating the conditioning disk from the holder and dropping the conditioning disk to the base plate (S4), allowing the transfer part to insert the conditioning disk into a container (S5), and allowing the transfer part to couple a new conditioning disk to the holder (S6). Here, the base-plate placement step S1 may include moving the transfer part 3 to allow the base plate 31 to rest at a location vertically spaced apart from the conditioning disk CD coupled to the holder H. For example, the transfer rotary part 37 and the first driving part A2 may operate to drive the base plate 31 to lie below the holder H.

Further in this regard, FIGS. 7, 8, 9, 10, 11, 12 and 13 further illustrate various aspects of the conditioning disk replacement method 'S' of FIG. 6.

Figure 7:
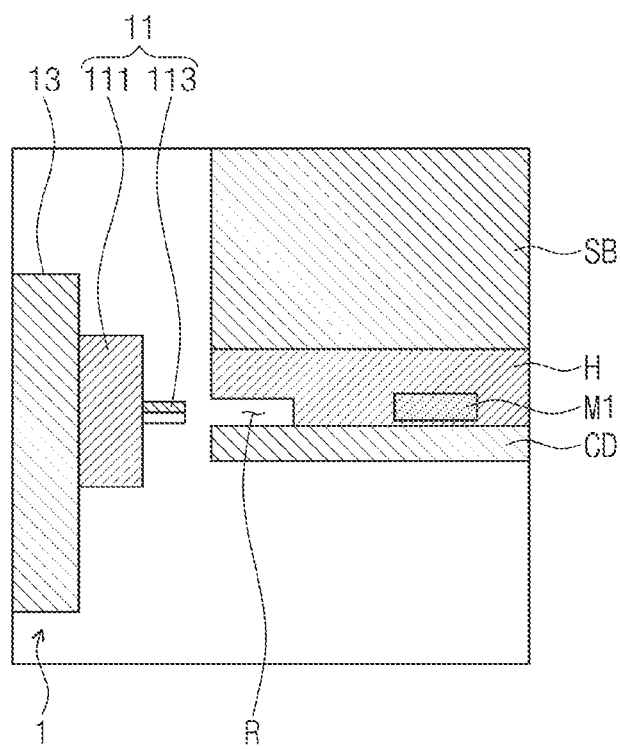
FIGS. 7 and 8 are respective cross-sectional views further illustrating step(s) of the conditioning disk replacement method of FIG. 6.
Figure 7:
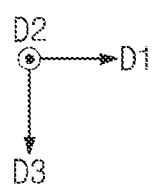
Figure 8:
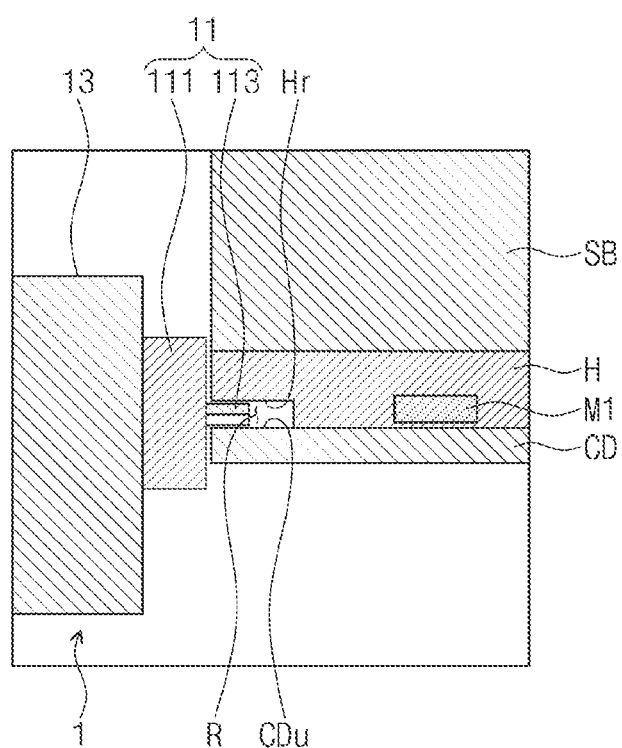
Figure 8:
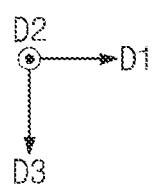

FIGS. 7 and 8 are respective cross-sectional views further illustrating step(s) of the conditioning disk replacement method of FIG. 6.

Referring to FIGS. 6, 7, and 8, the key insertion step S2 may include allowing the key 113 to inserted into the groove R. For example, the detachment driving part (see A1 of FIG. 2) and the moving part (15 of FIG. 2) may drive the rotary part 11 to translationally move such that the key 113 may be inserted into the groove R. In some embodiments, a relatively thin portion of the key 113 may be first inserted into the groove R. For example, as described in relation to FIG. 3, the groove R may first receive a portion having the second thickness d2, or a relatively thin portion of the key 113. In this case, a portion of the variable section may be first inserted into the groove R. Thus, due to inequalities between thicknesses of the key 113 and the groove R, a thick portion of the key 113 may be first inserted into the groove R. In a state where the key 113 is inserted into the groove R, a upper surface of the key 113 may be downwardly spaced apart from the recessed surface Hr. In addition, a lower surface of the key 113 may be upwardly spaced apart from a upper surface CDu of the conditioning disk CD Immediately after the key 113 is inserted into the groove R, the upper surface of the key 113 may contact the recessed surface Hr or the lower surface of the key 113 as well as the upper surface CDu of the conditioning disk CD.

Figure 9:
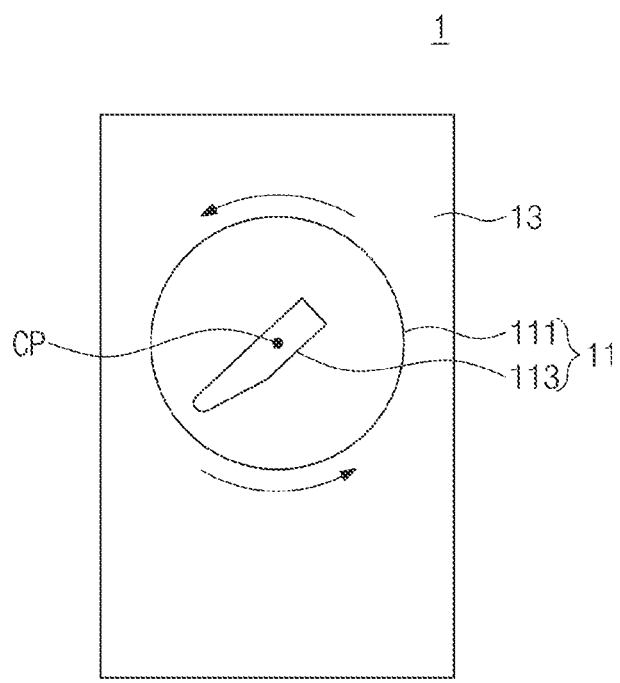
FIG. 9 is a front side view, and FIG. 10 a cross-sectional view that, collectively, further illustrate step(s) of the conditioning disk replacement method of FIG. 6.
Figure 9:
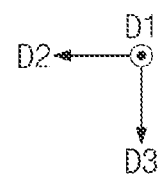
Figure 10:
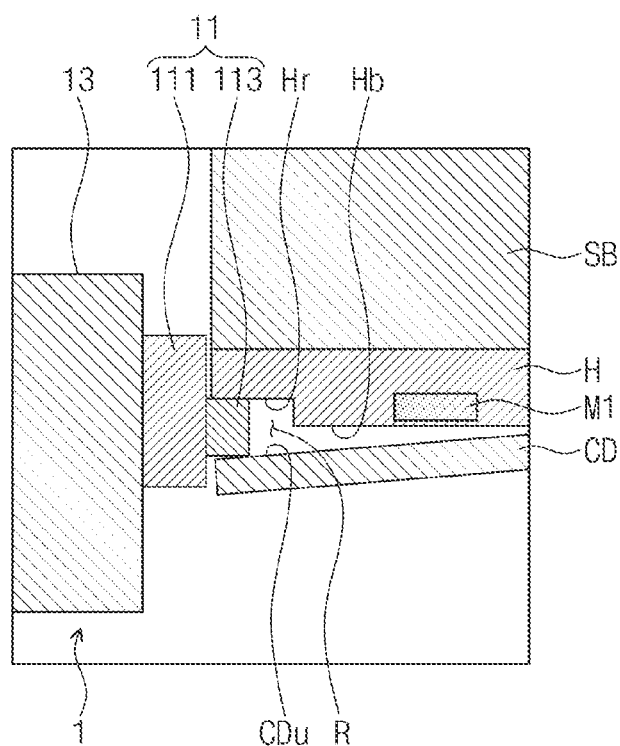

FIG. 9 is a front side diagram, and FIG. 10 a cross-sectional view that, collectively, further illustrate step(s) of the conditioning disk replacement method of FIG. 6

Referring to FIGS. 6 and 9, the key rotation step S3 may include allowing the rotary part 11 to rotate about an axis extending in the first horizontal direction D1. For example, a power provided from the detachment body 13 may allow the rotary part 11 to rotate about an axis parallel to the first horizontal direction D1. As illustrated in FIG. 9, the rotary part 11 may rotate in a counterclockwise direction about a center CP axis, thereby turning the key 113 in the counterclockwise direction.

Referring to FIG. 10, the key 113 may rotate and have an increased vertical thickness when viewed in cross section. Therefore, a portion of the upper surface of the key 113 may upwardly push the recessed surface Hr. In addition, a portion of the lower surface of the key 113 may be downwardly push the upper surface CDu of the conditioning disk CD. The key 113 may cause the conditioning disk CD to recede from the holder H. For example, a distance between the conditioning disk CD and the holder H may increase at one side where the groove R is formed. The conditioning disk CD and the holder H may be magnetically coupled to each other at another side where the groove R is not formed. Therefore, the conditioning disk CD may be inclined toward the one side.

Figure 11:
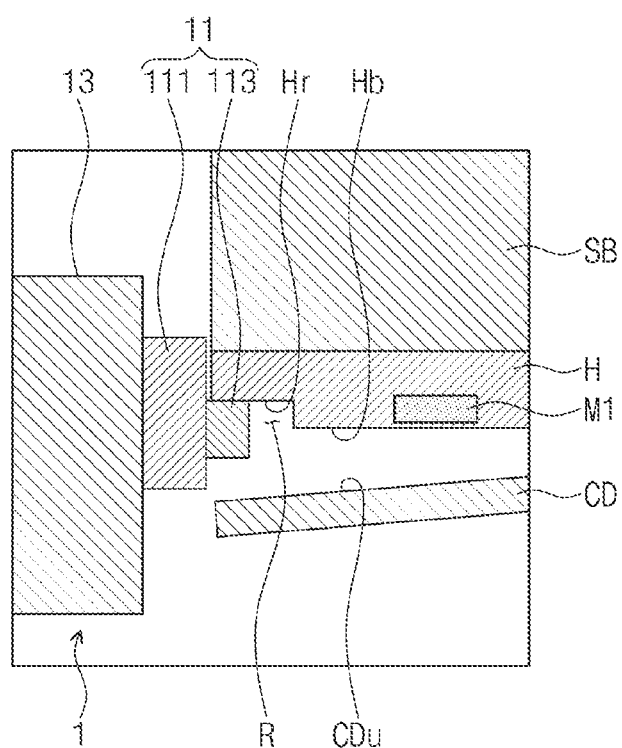
FIGS. 11 and 12 are respective cross-sectional views further illustrating step(s) of the conditioning disk replacement method of FIG. 6.
Figure 11:
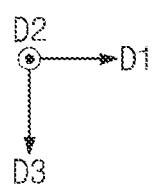
Figure 12:
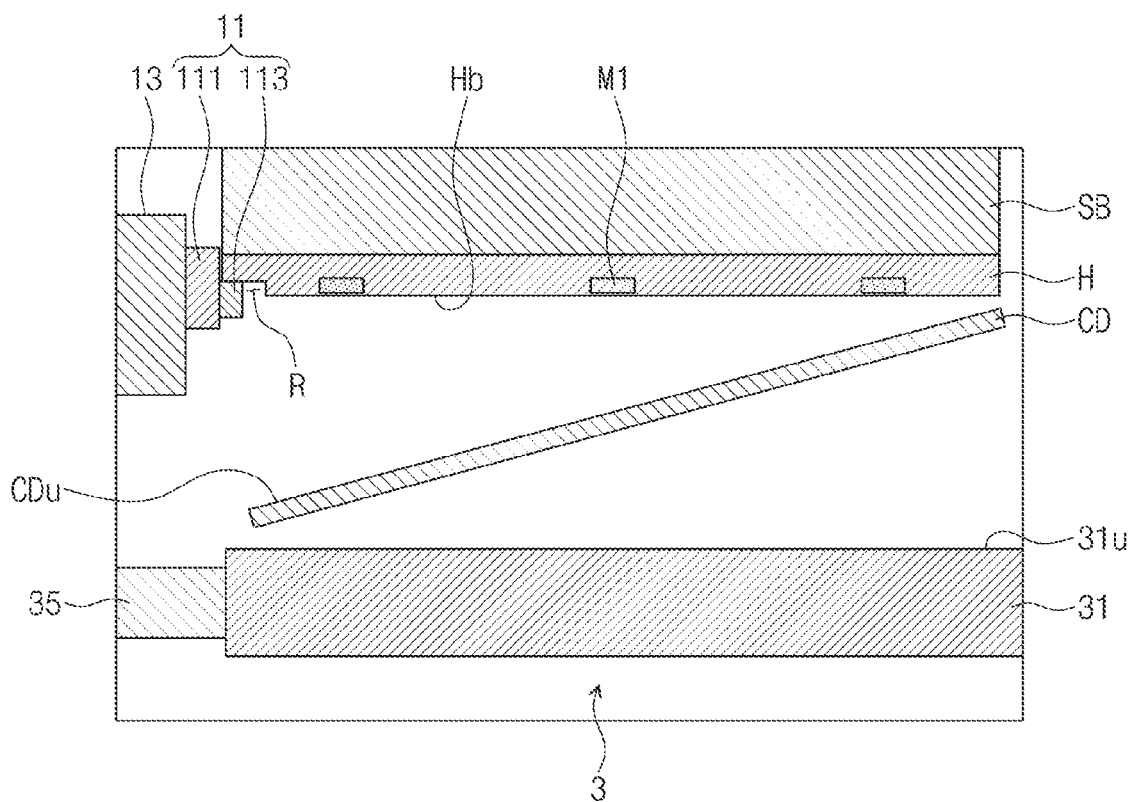
Figure 12:
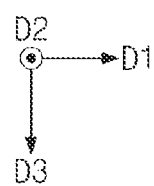

FIGS. 11 and 12 are respective cross-sectional views further illustrating step(s) of the conditioning disk replacement method of FIG. 6.

Referring to FIGS. 6, 11, and 12, the conditioning-disk drop step S4 may include allowing the key 113 to continuously rotate to further press the upper surface CDu of the conditioning disk CD. The key 113 may rotate a certain angle or more, and thus at a portion where the groove R is formed, there may be an increase in distance between the conditioning disk CD and the holder H. When the rotation of the key 113 is continuously performed, there may be a reduction in magnetic coupling force between the conditioning disk CD and the holder H. When the distance between the conditioning disk CD and the holder H at the groove R is greater than a certain value, gravity acting on the conditioning disk CD may be larger than the magnetic coupling force between the conditioning disk CD and the holder H. Accordingly, the conditioning disk CD may be separated from the holder H and may then be dropped. The dropped conditioning disk CD may rest on a upper surface $31u$ of the base plate 31 that stands by below the holder H.

The holder observation part (see DP of FIG. 1) may observe whether or not the conditioning disk CD has successfully separated from the holder H. For example, the holder observation part DP may capture an image of the lower surface of the holder H to ascertain whether or not the conditioning disk CD has separated from the holder H. When the holder observation part DP confirms separation of the conditioning disk CD, the transfer part 3 may start to move.

Referring to FIGS. 1 and 6, the conditioning-disk insertion step S5 may include allowing the container 5 to receive the base plate 31 on which the dropped conditioning disk CD is disposed. For example, one of the cantilever member(s) (see 51 of FIG. 5) in the container 5 may be identified as empty (e.g., lacking a conditioning disk CD), and the base plate 31 may move towards and below the empty cantilever member 51. When the base plate 31 is properly positioned below the empty cantilever member 51, a magnetic force of the coupling magnet M2 may be used to couple the conditioning disk CD on the base plate 31. For example, the conditioning disk CD may be separated from the base plate 31 and coupled to the lower surface 51b of the cantilever member 51. When the guide pin 55 is present on the lower surface 51b of the cantilever member 51, the conditioning disk CD may be coupled through the guide pin 55 to a certain position at the lower surface 51b of the cantilever member 51. For example, the guide pin 55 may guide a coupling position of the conditioning disk CD. The storage observation part 53 may ascertain whether or not the conditioning disk CD is properly coupled to the cantilever member 51. When the storage observation part 53 confirms the coupling of the conditioning disk CD, the base plate 31 may move.

Referring to FIGS. 5 and 6, the new coupling step S6 may include allowing the base plate 31 to lie beneath the cantilever member 51 where a new conditioning disk CD is present. The pressing part (see 33 of FIG. 1) may press the new conditioning disk CD coupled to the lower surface 51b of the cantilever member 51. The transfer part 3 may move in a state where the pressing part 33 presses the new conditioning disk CD. Because a coupling force, due to the coupling magnet M2, between the cantilever member 51 and the new conditioning disk CD, the pressing part 33 may separate the new conditioning disk CD from the cantilever member 51. The storage observation part 53 may ascertain whether or not the new conditioning disk CD is properly separated from the cantilever member 51. When the storage observation part 53 confirms the separation of the new conditioning disk CD, the base plate 31 may move. The base plate 31 may move toward below the holder H. When the base plate 31 approaches near the holder H, the holder magnet (see M1 of FIG. 4) may couple the new conditioning disk CD on the base plate 31 to the holder H. The holder observation part DP may ascertain whether or not the new conditioning disk CD is normally coupled to the lower surface of the holder H.

According to a conditioning disk replacement apparatus and a conditioning disk replacement method consistent with embodiments of the inventive concept, a conditioning disk may be automatically separated from and coupled to a holder that is used by a chemical mechanical polishing (CMP) apparatus. For example, a conditioning disk replacement operation may be automatically performed in the CMP apparatus. Therefore, it may be possible to reduce man hours otherwise required to perform replacement operations.

According to a conditioning disk replacement apparatus and a conditioning disk replacement method consistent with embodiments of the inventive concept, because a key rotation method is used to separate the conditioning disk from the holder, the constituent separation approach is relatively simple, thereby improving reliability.

According to a conditioning disk replacement apparatus and a conditioning disk replacement method consistent with embodiments of the inventive concept, a conditioning disk may be promptly and accurately replaced.

According to a conditioning disk replacement apparatus and a conditioning disk replacement method consistent with embodiments of the inventive concept, a conditioning disk may be replaced automatically.

According to a conditioning disk replacement apparatus and a conditioning disk replacement method consistent with embodiments of the inventive concept, a simple structure and principle of operation may be used to increase reliability of conditioning disk replacement.

Certain embodiments of the inventive concept have been described in in relation to the accompanying drawings. However, those skilled in the art will appreciate that various changes and modifications may be made to such illustrative embodiments without departing from the scope of the inventive concept, as defined by the following claims.

What is claimed is:

1. A conditioning disk replacement apparatus, comprising:
   a detacher configured to separate a conditioning disk from a holder;
   a transporter configured to transfer the conditioning disk; and
   a container configured to store the conditioning disk,
   wherein the detacher includes a detachment body and a rotator that is coupled to the detachment body,
   wherein the rotator includes a key protruding outward from the rotator in a first horizontal direction,
   wherein the rotator is configured to rotate the key about an axis extending in the first horizontal direction, and wherein rotating the key about the axis, after the key is inserted into a groove between the conditioning disk and the holder, causes an upper surface of the key to press on a portion of a lower surface of the holder and causes a lower surface of the key to press on a portion of an upper surface of the conditioning disk so as to separate the conditioning disk from the holder,
   wherein the container includes a plurality of cantilever members, and
   wherein each cantilever member of the plurality of cantilever members includes a respective coupling magnet and at least one respective guide pin, the at least one respective guide pin coupled to a lower surface of the corresponding cantilever member.

2. The apparatus of claim 1, wherein the key extends a certain length in a second horizontal direction.

3. The apparatus of claim 2, wherein the key includes a variable thickness section having a thickness that decreases in the second horizontal direction.

4. The apparatus of claim 3, wherein a ratio between a thickest portion of the variable thickness section and a length of the key ranges from 1:1 to 1:20.

5. The apparatus of claim 1, wherein two or more cantilever members of the plurality of cantilever members are vertically separated.

6. The apparatus of claim 1, wherein the transporter includes:
   a base plate,
   a second holder on the base plate, and
   a transfer rotator that is configured to rotate the base plate,
   wherein the second holder includes a pair of gripping claws that rotate on the base plate, and the second holder is configured to fix the conditioning disk on the base plate.

7. A conditioning disk replacement apparatus, comprising:
   a detacher configured to separate a conditioning disk from a holder of a chemical mechanical polishing apparatus; and
   a container that includes a plurality of cantilever members,
   wherein the detacher includes a detachment body and a rotator that is coupled to the detachment body,
   wherein the rotator includes a key protruding in a first horizontal direction from the detachment body and extending in a second horizontal direction,
   wherein the rotator is configured to rotate the key about an axis extending in the first horizontal direction, and wherein rotating the key about the axis, after the key is inserted into a groove between the conditioning disk and the holder, causes an upper surface of the key to press on a portion of a lower surface of the holder and causes a lower surface of the key to press on a portion of an upper surface of the conditioning disk so as to separate the conditioning disk from the holder, and
   wherein each cantilever member of the plurality of cantilever members includes a respective coupling magnet and at least one respective guide pin, the at least one respective guide pin coupled to a lower surface of the corresponding cantilever member.

8. The apparatus of claim 7, wherein the key includes a variable thickness section having a thickness that decreases in the second horizontal direction.

9. The apparatus of claim 7, further comprising:
   a transporter configured to transfer the conditioning disk and including a base plate, a second holder on the base plate, and a transfer rotator configured to rotate the base plate.

10. The apparatus of claim 9, wherein the second holder includes a pair of gripping claws configured to rotate on the base plate, and the second holder is configured to fix the conditioning disk on the base plate.

11. The apparatus of claim 7,
wherein the plurality of cantilever members are configured to store the conditioning disk using one cantilever member of the plurality of cantilever members, and wherein two or more cantilever members of the plurality of cantilever members are vertically separated.

12. The apparatus of claim 7, further comprising:
a detachment driver configured to laterally and vertically move the detacher.

13. The apparatus of claim 7, wherein the rotator further includes a rotary body coupled to the detachment body, and the key protrudes outwardly in the first horizontal direction from the rotary body.

* * * * *